United States Patent Office 3,501,340
Patented Mar. 17, 1970

3,501,340
METHOD OF CLEANING GLASS AND QUARTZ SURFACES
Milton Burton, Mishawaka, Ind., assignor to the United States of America as represented by the United States Atomic Energy Commission
No Drawing. Filed Nov. 1, 1967, Ser. No. 679,639
Int. Cl. C03c 17/00
U.S. Cl. 117—124                5 Claims

ABSTRACT OF THE DISCLOSURE

A method of treating glass and quartz containers to reduce spontaneous decomposition of labile compounds stored therein by contacting the surfaces of said containers with hydrazine and baking the contacted surfaces to remove all traces of hydrazine.

CONTRACTUAL ORIGIN OF THE INVENTION

The invention described herein was made in the course of, or under, a contract with the United States Atomic Energy Commission.

BACKGROUND OF THE INVENTION

This invention relates to a method of treating glass and quartz surfaces. In more detail the invention relates to a method of treating glass and quartz surfaces so that contact with such surfaces will not cause a reaction by labile gaseous substances or cause oxidation of liquids to form trace impurities.

Although this invention will work equally well for labile gases and liquids, this discussion will generally be limited to labile gaseous compounds.

Prior to my invention it has been impossible to store diazomethane in a glass vessel since in even a very clean vessel 85% of the diazomethane will react and disappear in about two hours. What is true of diazomethane is true also of various other labile gaseous compounds.

A procedure frequently followed for the cleaning of glass and quartz surfaces and vessels after washing with a soap solution is to clean the object very thoroughly with concentrated boiling nitric acid or a solution of sulfuric acid and nitric acid. After cleaning, the object is washed to neutrality with an alkaline solution, then rinsed with distilled water and baked to dryness. This procedure, however, still leaves what appears to be oxidation centers either on or in the surface just cleaned which cause relatively rapid destruction of readily oxidizable compounds such as labile gases.

SUMMARY OF THE INVENTION

I have invented a method of treating the surface of glass and quartz which eliminates many of the problems associated with prior known methods for cleaning these surfaces in preparation for the storage of labile gases. The method of this invention involves treating the surfaces with hydrazine and then baking to remove all traces of the hydrazine, subsequent to cleaning the surface of the object by usual methods. By this treatment, the surface is changed from having oxidizing characteristics to reducing characteristics and labile gases such as diazomethane may be safely stored therein for considerable periods of time.

It is accordingly the object of my invention to develop a method of treating glass or quartz surfaces to eliminate oxidizing species therefrom.

It is another object of the present invention to develop a method of treating glass or quartz containers so that labile gaseous compounds such as diazomethane can be stored therein.

DESCRIPTION OF THE PREFERRED EMBODIMENT

These and other objects of the present invention are attained by rinsing the surfaces to be treated with hydrazine after thoroughly cleaning the surfaces in the conventional manner and then baking in the absence of air to remove the hydrazine from the surfaces.

Any conventional method for cleaning glass and quartz surfaces may be used on the surfaces before treatment with hydrazine. In general, it was found that concentrated boiling nitric acid is satisfactory to cleanse the surfaces of any organic material, although a solution of sulfuric acid and nitric acid may also be use. The surfaces are next rinsed in a solution of sodium hydroxide or ammonia for a period of time sufficient to neutralize any acid present. Any alkali which will neutralize the acid retained on the surfaces is satisfactory. The surfaces are then thoroughly rinsed with distilled water to remove any remaining alkaline solution.

Pure hydrazine is next applied to the surfaces. It is important that all surfaces which may come in contact with the labile substances be rinsed with the hydrazine. The method by which the hydrazine is applied is unimportant. A satisfactory method is to pour hydrazine into a vessel and swirl it until the interior has all been rinsed and then pour off the surplus liquid.

After the surfaces to be treated have been thoroughly rinsed with hydrazine, the object is heated in an oven in the absence of oxygen. The object may either be heated in a vacuum or in any inert atmosphere such as nitrogen. The temperature and time are not critical just as long as the surface is baked to dryness and all nitrogen and hydrogen present are driven off. A temperature of about 300° C. for five minutes was found to provide sufficient drying time and temperature. A lower temperature would be quite satisfactory if the drying is done in a vacuum. After baking is complete, care must be taken not to contaminate the surfaces with oxygen.

The mechanism by which the hydrazine works is unknown. Results suggest the treated surfaces are in some way changed so that the oxidizing action of the surfaces is destroyed.

This method, in addition to treating glass and quartz surfaces, applies also to treating the surfaces of glass fibers and the surfaces of powders. It modifies the properties of these surfaces and, among other effects, will permit deposition of films which should not be oxidized, such as sputtered aluminum. Such treatment will also permit reactions on such surfaces which cannot be accomplished on glass or quartz surfaces with normal characteristics.

In the table below are the results of various methods of treating flasks used to store diazomethane. Normal spontaneous decomposition of the compound in a flask of this type will normally amount to about 85% of the diazomethane present after one hour. It can be seen below that by washing and treating the flask by the method of this invention decomposition of the diazomethane stored in the flask amounted to 0.574% after one hour and 1.44% after three hours of storage.

|  | $CH_2N_2$ in moles | $N_2$ present after 1 hour in moles | Diazomethane decomposed, percent |
|---|---|---|---|
| Flask washed in hydrazine | $2.2 \times 10^{-4}$ | $3.90 \times 10^{-5}$ | 17.7 |
| Flask washed in hydrazine and baked in $O_2$-free atmosphere | $2.045 \times 10^{-4}$ | $1.52 \times 10^{-6}$ | 0.725 |
| Flask washed in solution of $H_2SO_4$ and $HNO_3$ prior to being treated as above. | $1.81 \times 10^{-4}$ $1.84 \times 10^{-4}$ | $1.74 \times 10^{-6}$ $^1 2.65 \times 10^{-5}$ | 0.574 $^2 1.44$ |

[1] Nitrogen present after three hours storage.
[2] Diazomethane decomposed after three hours storage.

The following example is given as an illustration of the method of this invention and is not to be taken as limiting the scope or extent of the invention.

EXAMPLE

A glass container was cleaned with boiling concentrated nitric acid and then washed to neutrality with a solution of sodium hydroxide. The interior of the container was thoroughly rinsed with hydrazine and the container was baked in an oven containing a nitrogen atmosphere at about 300° C. for about five minutes. After the container had cooled, and being careful to prevent contamination with oxygen, freshly prepared diazomethane was placed in the container which was then sealed. After two hours, the container was opened and the amount of decomposition was determined by ascertaining the nitrogen gas present. Results showed that spontaneous decomposition and oxidation of the diazomethane amounted to only 0.5% after two hours.

The embodiments of the invention in which an exclusive property or privilege is claimed are defined as follows:

1. A method of treating glass surfaces to prevent decomposition of easily oxidizable compounds in contact therewith comprising: contacting said surfaces with hydrazine and baking said contacted surfaces to dryness in an oxygen-free atmosphere.

2. The method of claim 1 wherein said easily oxidizable compounds are gaseous.

3. The method of claim 1 wherein said surfaces are first cleaned thoroughly with concentrated boiling nitric acid and washed to neutrality with an alkaline solution.

4. The method of claim 3 wherein said surfaces are baked at about 300° C. for about five minutes.

5. The method of claim 4 wherein said surfaces are quartz.

References Cited

UNITED STATES PATENTS

| | | | |
|---|---|---|---|
| 2,261,691 | 11/1941 | Lyle et al. | 65—30 XR |
| 3,314,772 | 4/1967 | Poole et al. | 65—30 |
| 3,348,934 | 10/1967 | Hinson et al. | 65—30 |
| 3,421,915 | 1/1969 | Letter | 65—30 XR |

ALFRED L. LEAVITT, Primary Examiner

W. F. CYRON, Assistant Examiner

U.S. Cl. X.R.

65—30